R. SIMMONS.
LEAF SPRING.
APPLICATION FILED JULY 26, 1920.
1,371,003.
Patented Mar. 8, 1921.
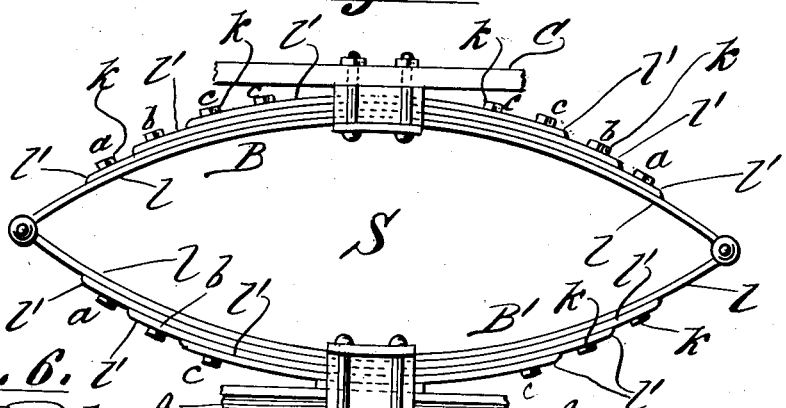
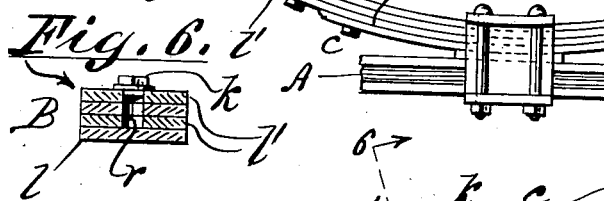
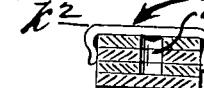
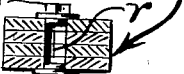
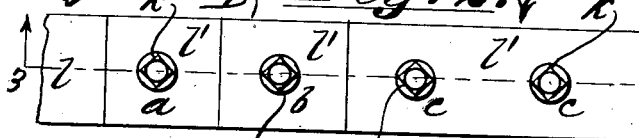
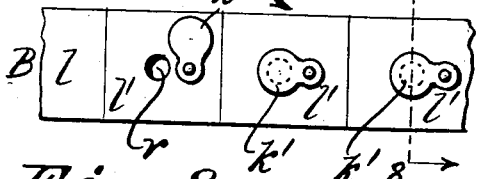
Inventor:
Ralph Simmons,
By his Attorney
Geo. Wm Hiatt

UNITED STATES PATENT OFFICE.

RALPH SIMMONS, OF EAST ORANGE, NEW JERSEY.

LEAF-SPRING.

1,371,003.

Specification of Letters Patent.

Patented Mar. 8, 1921.

Application filed July 26, 1920. Serial No. 399,147.

*To all whom it may concern:*

Be it known that I, RALPH SIMMONS, a citizen of the United States, and a resident of East Orange, county of Essex, and State of New Jersey, have invented certain new and useful Improvements in Leaf-Springs, of which the following is a specification.

While applicable to composite leaf springs generally wherever used in the arts, my improvements are designed more particularly for vehicle springs of this type, and especially for those forming part of automobile equipment, the object being to effect an adequate lubrication of the contactual surfaces of the leaves, and to thus practically obviate frictional resistance between them, and eliminate noise otherwise resultant from the movement of the superposed leaves as related to each other in adapting themselves to variations in load, traffic vibration, etc.

I obviate these difficulties and attain adequate intermediate lubrication of the leaves of the spring by my invention, which consists essentially in forming the leaves of the springs with coincidental cylindrical lubricant pockets or reservoirs in such manner that the leaves themselves function to force and spread the lubricant between their contactual surfaces as the latter slide over each other during the vibrant oscillations of the spring in actual use. As a result of the ample and continuous lubrication thus effected between the free, slidable outer portions of the leaves, frictional resistance is reduced to a minimum degree, and all perceptible noise is obviated, while the elasticity and resilience of the spring, considered as a unitary structure, is increased to the maximum.

In the accompanying drawings,

Figure 1, is an elevation of a composite elliptical leaf spring for vehicles embodying my invention;

Fig. 2, is a top view, on a larger scale, of a portion of the upper bow of a leaf spring such as shown in Fig. 1;

Fig. 3, is a central longitudinal sectional elevation taken upon plane of line 3—3, Fig. 2;

Fig. 4, is a view similar to Fig. 2, showing the upper side of a portion of the lower bow of the leaf spring shown in Fig. 1;

Fig. 5, is a central longitudinal sectional elevation taken upon plane of line 5—5, Fig. 4;

Fig. 6, is a transverse sectional elevation taken upon plane of line 6—6, Fig. 3;

Fig. 7, is a top view of a portion of the spring showing a modification in the reservoir closure means;

Fig. 8, is a transverse section taken upon plane of line 8—8, Fig. 7;

Figs. 9, 10, and 11, are sectional views showing modifications.

As hereinbefore intimated my method of lubrication is applicable to leaf springs generally, although I show and describe it by way of exemplification as embodied in an elliptical form of vehicle spring—the principle involved being the same irrespective of the shape or type of leaf spring involved.

With this understanding, B, represents the upper bow of an elliptical spring, and B', the lower bow thereof—the spring S, in its entirety being interposed between and secured to, say, the axle A, and a part of the chassis C, of an automobile, in a manner well known in the art.

Each bow B, B', is composed of a plurality of superposed elongate flat elastic resilient metallic leaves, of different lengths, rigidly secured together medially by suitable means. The ends of the full length leaves $l, l$, of each bow set B, B', are coupled together in the usual manner, but the ends $l', l'$, of the over and under lapping leaves $l', l'$, are free, so that they can slidably adapt themselves to the flexure of the spring. Under ordinary conditions of use heretofore this sliding or creeping of the free portions of the lap leaves $l', l'$, one over the other, engenders sufficient frictional resistance between the contactual surfaces to produce a vexatious rasping sound, and is otherwise detrimental in that it generates heat that impairs the temper and resilience of the leaves, and also results in excessive wear which shortens the life and utility of the spring—no simple, inexpensive means having been devised prior to my invention whereby the said contactual surfaces may be effectually lubricated.

This desirable result I attain in a positive manner by forming coincidental lubricant containing cells or reservoirs $r, r$, directly in the leaves substantially as shown in the drawings, said cells or reservoirs $r, r$, being of cylindrical form, and extending through one or more of the leaves. Thus in two ply portions of a bow where the overlap is single, as at $a$, in the drawings, the cell will extend only through the upper leaf; in three ply portions of a bow, as at $b$, the cell will extend through the two upper leaves; while in four ply portions of a bow, as at $c$, the cell will extend through the three upper leaves, and so on, according to the number of spring leaves incorporated in each bow,—it being understood that I do not limit myself in this respect to any specific number of leaf springs in a bow.

The circular perforations which constitute the cylindrical lubricant container cells $r$, $r$, in the overlapping portions of the bow leaves are of course coincident when the spring is at rest in expanded position, but as the spring is depressed under stress of load it is obvious that the flexing of the leaves will result in slight divergence from perfect alinement between the said perforations, so that spring vibration will tend constantly to cause the component side walls of the cells to forcefully introduce the lubricant betwixt the adjacent portions of the superposed leaves,—thereby insuring a positive and equable distribution of said lubricant to and between the opposed contactual surfaces thereof.

Any suitable or desired number of lubricant container cells $r$, $r$, may be provided for each bow or spring, as may be found most expedient. It will be noted in this connection that in the first eight figures of the drawings the lowest leaf in each bow functions as the bottom plate for the series of lubricant cells in said bow, whether the same be the upper or lower bow.

Provision is preferably made for closing the upper ends or inlets to the cells $r$, $r$, after the latter are charged with the lubricant, so as to exclude dust and extraneous matter therefrom. Thus, screw caps $k$, may be provided for the purpose; or pivotal covers $k'$, as indicated in Figs. 7 and 8; or any other suitable mechanical expedient may be resorted to to effect the closure of the said cells.

I have herein shown and described my cylindrical lubricant-container cells $r$, $r$, as formed mainly in the upper leaves and closed at their lower ends by a lower leaf, although it is obvious that an alternative arrangement might be resorted to with like effect,—the upper leaves being utilized to close the upper ends of the cells as in Fig. 9, and the lower ends of the cells being sealed by suitable closures; or the cell perforations might be extended through all the leaves and sealed at both extremities by closures as indicated in Fig. 10,—the essential and distinctive feature of my invention in this respect being the formation of the normally coincidental lubricant container cells directly within the leaves themselves substantially as set forth, in conjunction with suitable closure means.

In Fig. 11, a straddle spring clip band $k^2$, is shown as a means of closure for the lubricant cell.

Mechanical closures however are not indispensable, as cup grease or any other suitable plastic substance may be used to confine the lubricant in the leaf cells.

I am aware that longitudinal lubricating grooves have been formed in leaf springs, but such grooves must be made in the original leaf, are expensive to make, and weaken the springs materially, whereas my normally coincidental cylindrical lubricating cells $r$, $r$, may be drilled and tapped at small cost in leaf springs both old and new, and furthermore facilitate the distribution of the lubricant, by means of the shearing action of the adjacent edges of the cell sections, during the elongate creeping of the individual leaves one upon the other during the flexing of the spring in its entirety when subjected to oscillation and variations in pressure.

What I claim as my invention and desire to secure by Letters Patent is,

A composite leaf-spring of the character designated having leaves formed with normally coincident cylindrical lubricant container cells continuous throughout the series of leaves with the lowermost leaf imperforate to function as the bottom plate for the series of cells in the bow.

RALPH SIMMONS.

Witnesses:
 GEO. WM. MIATT,
 DOROTHY MIATT.